United States Patent [19]
Shirasaki

[11] Patent Number: 4,548,478
[45] Date of Patent: Oct. 22, 1985

[54] OPTICAL DEVICE

[75] Inventor: Masataka Shirasaki, Kawasaki, Japan

[73] Assignee: Fujitsu Limited, Kawasaki, Japan

[21] Appl. No.: 329,940

[22] Filed: Dec. 11, 1981

[30] Foreign Application Priority Data

Dec. 15, 1980 [JP] Japan .................. 55-176687

[51] Int. Cl.⁴ ............................... G02F 1/29
[52] U.S. Cl. .................. 350/377; 350/388; 350/403
[58] Field of Search .............. 350/377, 382–383, 350/388, 401, 403, 380–381, 385, 375, 376, 402, 421; 356/351, 365

[56] References Cited

U.S. PATENT DOCUMENTS

| | | | |
|---|---|---|---|
| 1,093,639 | 4/1914 | MacDougall | 350/421 |
| 1,680,534 | 8/1928 | Garbutt et al. | 350/421 |
| 3,572,895 | 3/1971 | Schmidt et al. | 350/401 |
| 3,684,350 | 8/1972 | Wentz | 350/388 |
| 3,719,414 | 3/1973 | Wentz | 350/403 |
| 4,103,260 | 7/1978 | Buchman | 350/403 |
| 4,178,073 | 12/1979 | Uchida et al. | 350/375 |
| 4,359,268 | 11/1982 | Kondo | 350/377 |
| 4,375,910 | 3/1983 | Seki | 350/403 |

OTHER PUBLICATIONS

Matsumoto, T., "Polarization-Independent Isolators for Fiber Optics", Electronics & Comm. in Japan, vol. 62-C, #7, 1979, pp. 113–118.
Müller, Von R., "Polarisiertes Licht Bis 1900 AE", Optik 20, 1963, pp. 510–511.
Bennett et al., "Handbook of Optics, Section 10", pp. 10–25, McGraw-Hill 1978.
Shurcliff, W. A., "Polarized Light", pp. 80–82, Harvard U. Press, 1962.

*Primary Examiner*—William H. Punter
*Attorney, Agent, or Firm*—Staas & Halsey

[57] ABSTRACT

An optical device, such as an optical isolator or an optical modulator, comprises a 45° Faraday rotator or an electrooptic crystal which is interposed between tapered plates of birefringent material for separating and combining polarized light. The tapered plates are made of rectile or calcite. The optical device is polarization independent, and it can be miniaturized with less components than prior art optical devices. The optical isolator also allows one hundred percent of light in the forward direction to pass through it. The optical modulator can be used as a voltage senser.

8 Claims, 14 Drawing Figures

OPTICAL DEVICE

BACKGROUND OF THE INVENTION

This invention is directed to an optical device such as an optical isolator or an optical modulator, and more particularly to an optical device comprising a pair or tapered birefringent plates, or an optical isolator or an optical modulator utilizing said tapered birefringent plates.

Optical fiber communication systems are now in practical use, and efforts are being made to advance research and development in this field. Because of this, requirements for optical devices with more versatile functions have also increased. For example, optical circulators are required for two-way communications. Since optical polarization cannot in general be preserved in fibers, it is preferable to develop optical circulators having characteristics that are not affected by incident light polarization.

An optical isolator is used as a functional component in light transmission systems to realize a one way transmission of light. In a typical example of the isolator as illustrated in FIG. 1, there is provided a 45° Faraday rotation isolator 3 which always rotates in one direction by virtue of a permanent magnet. A polarizer 2 and an analyzer 2' are respectively placed before and after the Faraday rotation isolator 3, with the polarizer 2 and analyzer 2' being maintained at relative positions rotated 45° with one another.

Light emitted from an optical fiber 1 is divided or separated into parallel beams 5 by a lens 7, and of the parallel beams 5, the polarizer 2 allows only polarized light in a particular direction to pass through it, and any other light is reflected and eliminated. Polarized light that has passed through the polarizer 2 emanates from the Faraday rotation isolator 3 with its plane of polarization rotated 45°. Analyzer 2' is so arranged that polarized light with its plane of polarization rotated 45° passes through the analyzer 2', focussed by a lens 8 and enters an optical fiber 4. On the other hand, of light 6 coming in the reverse direction from the optical fiber 4, only polarized light which is rotated by 45° relative to the polarizer 2 may pass through the analyzer 2'. Polarized light that has passed through the analyzer 2' will have its plane of polarization rotated 45° by the Faraday rotation isolator 3, and then emanates therefrom. Thus, polarized light 6 that is rotated 90° relative to the polarizer 2 and that emanates from isolator 3 to be reflected by the polarizer 2 is eliminated. Because of this, light in the forward direction propagrates forwardly while light in the reverse direction is eliminated. However, the isolator just described is polarization dependent even with respect to light in the forward direction. In other words, specific polarized light only can pass through the isolator in the forward direction, and remaining light is not effectively utilized because it is eliminated.

The present invention also concerns a phase difference-light intensity converter. Functionally, such a converter is used as a device to convert the phase difference caused by a phase difference modulator (such as a Faraday rotation isolator bringing about rotation of the plane of polarization or an electrooptic device causing elliptical polarization) to transmission light intensity.

Another prior art device shown in FIG. 2 employs a polarizer 12 and analyzer 12'. In case of an electrooptic device, there is provided a phase difference modulator 13 which functions to give phase difference to two orthogonal components of the plane of polarization in response to an electrical input signal thereto, with polarizer 12 and analyzer 12' respectively placed before and after the modulator 13. Polarization axes of polarizer 12 and analyzer 12' are maintained at a predetermined angle $\theta$ with respect to each other depending on the usage of the device.

Light emitted from an optical fiber 11 is collimated into parallel beams by a first lens 16. Only a linear polarization component in a particular direction of parallel beam 15 is allowed to pass through the polarizer 12, and all other light is reflected and eliminated. Linear polarized light that passed through the polarizer 12 undergoes elliptical polarization by virtue of the converter 13 and is emitted. Of this light, only linear polarized light in the direction of the principal axis of the analyzer 12' passes through it, is focussed by a second lens 17 and then enters an optical fiber 14.

Therefore, where only the component having an angle of rotation of the plane of polarization (polarization plane rotation angle) $\theta$ (or $\theta + \pi/2$) given by the converter 13 enters the optical fiber 14, the component having a polarization plane rotation angle $\theta + \pi/2$ (or $\theta$) is reflected by the analyzer 12' and does not enter the optical fiber 14. Thus, what is shown is a device converting the phase difference to light intensity which allows the component having the polarization plane rotation angle $\theta$ to pass through it.

However, the device just described is polarization dependent relative to incident light from the optical fiber 11. That is, of incident light, only the component having a specific polarization plane is allowed to pass through the polarizer 12, with all other light eliminated and not utilized at all.

Japanese Patent Publication (Unexamined) No. 149046 of 1978 published on Dec. 26, 1978 concerns an invention titled: Optical isolator. This isolator comprises first and second birefringent crystals and a Faraday rotator interposed therebetween. The Faraday rotator is characterized in that it rotates the polarization direction of each of polarized beams $(2m \pm \frac{1}{2}) \times 90°$ and $(2n \pm \frac{1}{2}) \times 90°$, where m and n are arbitrary integers, and that it is a non-reversible light rotating device.

Japanese Patent Publication (Unexamined) No. 79060 of 1979 published on June 23, 1979 is for an invention titled: Optical modulator. This modulator comprises a first crystal member which is capable of rotating the plane of polarization of light beam as much as 90° when electric voltage is applied thereto, and it is interposed between second and third birefringent crystal members formed of a uniaxial crystal. The faces of the second and third crystal members are placed in the path of light and arranged parallel. The optic axis of each of the second and third crystal members is so inclined relative to said face that ordinary rays and extraordinary rays form a predetermined angle. A luminous flux of light entering the second crystal member is emitted therefrom as ordinary ray and extraordinary ray separated from each other with a predetermined distance. Ordinary rays and extraordinary rays then enter the first crystal member, with the direction of polarization of each ray being rotated 90° or 0° depending on whether electric voltage is applied to the first crystal member or not. Ordinary rays and extraordinary ray, whether rotated do not, enter the third crystal member and, due to the birefringency of the third crystal, these rays are combined at a predetermined position where an output terminal is provided or cancelled out.

In an article titled: Polarization-independent isolators for fiber optics, which was published in the Journal of Denshi Tsushin Gakkai (Electronic Communications Association), 1979/7 Vol. J. 62-CNo. 7, pp. 505–512, isolators schematically illustrated in FIGS. 3A, 3B and 3C are described. In these figures, reference numerals 21 and 22 denote optical fibers, 23 and 24 birefringent crystals, 25 a 45° Faraday rotation isolator, 26 a 45° rotator which functions as a compensation plate, o denotes an ordinary ray, and e an extraordinary ray.

Although practical isolators for fiber optics independent of polarization have been disclosed, a combination of lenses for forming focal points as shown in FIG. 3C are required for the operation of the disclosed polarization-independent isolators. This is because in combining parallel beams, the beam that is slightly shifted and the beam that is not shifted can hardly be distinguished. Because of the lens arrangement as shown, fibers 21 and 22 must be kept apart a considerable distance. This makes miniaturization of isolators difficult. In addition, lens aberration becomes large in the shown combination, bringing about increase of both insertion loss and cross-talk, for example, insertion loss in the order of 5 dB and cross-talk in the order of −20 dB.

SUMMARY OF THE INVENTION

It is therefore a general object of the present invention to offer an optical device, such as an optical isolator or an optical modulator, in which polarization dependence is eliminated.

It is another object of the invention to overcome the problem encountered in the conventional art by offering an optical device, such as an optical isolator or an optical modulator, which allows 100% of light in the forward direction to pass through it.

It is a further object of the invention to provide an optical device for, such as an isolator or modulator, which has a simple and compact configuration with fewer parts in comparison with prior art devices.

In one embodiment of the invention to achieve the above-described object, an optical device comprises an element for rotating a plane of polarization interposed between elements which separate and combine polarized light, and these separating and combining elements are constituted by tapered plates of birefringent material.

In another embodiment of the invention to solve the problems in the prior art, a device to convert the phase difference to light intensity is offered.

More specifically, there is provided a device to convert the phase difference to light intensity comprising: an optical fiber for incident light, a first lens, an element to separate polarized light, a plane of polarization modulator, an element to combine polarized light, a second lens, an optical fiber to receive light, all arranged in the above order in the path of light propagation. Tapered plates of birefringent material are used to make elements to separate and combine polarized light, and when light from the optical fiber for incident light is focalized by the second lens, light having a polarization plane rotation angle $\theta$ (or $\theta + \pi/2$) is introduced into the light receiving fiber from its face at the end independently of the polarization of incident light, and light having a polarization plane rotation angle $\theta + \pi/2$ (or $\theta$) is so polarized that it focalizes at a point which is away from the principal axis of the light receiving fiber at the face of the fiber's end by a distance which is larger than the core diameter of the optical fiber.

The above and further objects and novel features of the invention will appear more fully from the following detailed description when read in connection with the accompanying drawings. It is to be expressly understood, however, that the drawings are not intended as a definition of the invention but are for the purpose of illustration only.

DESCRIPTION OF THE PREFERRED EMBODIMENT

Figure 1:
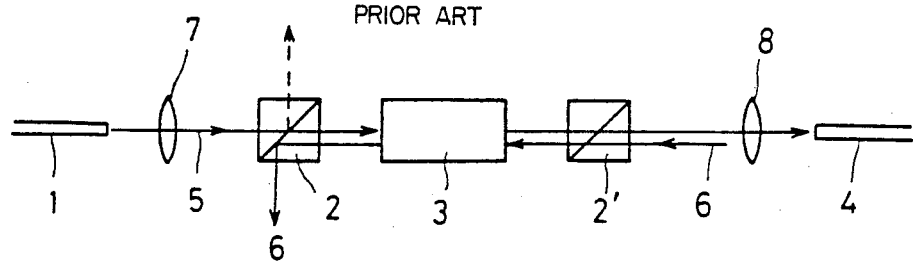
FIG. 1 is a schematic view of a prior art optical isolator.
Figure 2:
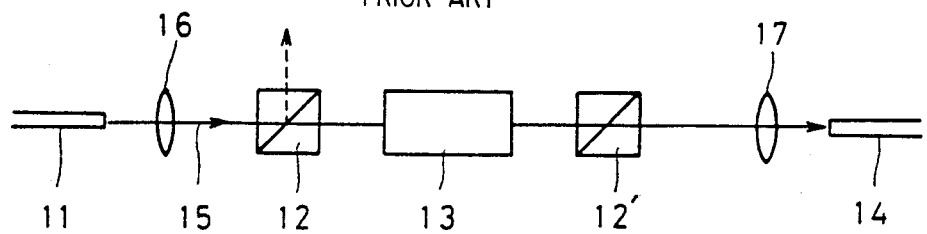
FIG. 2 is a schematic view of a prior art phase difference-light intensity converter.
Figure 3A:
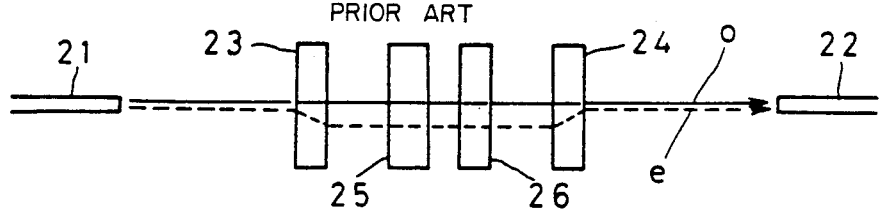
FIGS. 3A, 3B and 3C are schematic views of a prior art isolator.
Figure 3B:
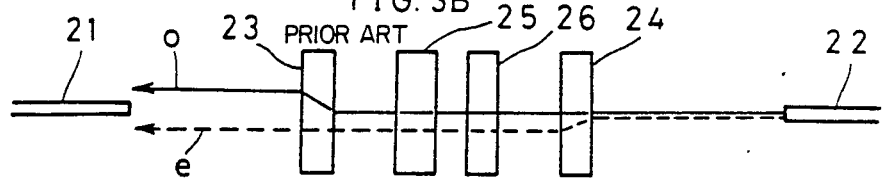
Figure 3C:
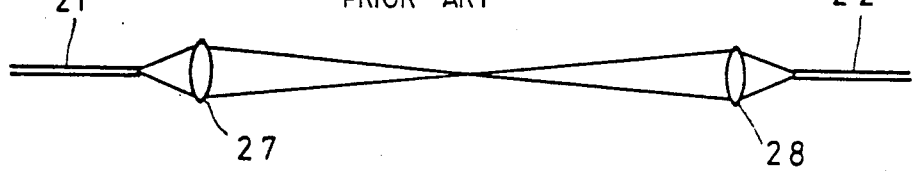
Figure 4A:
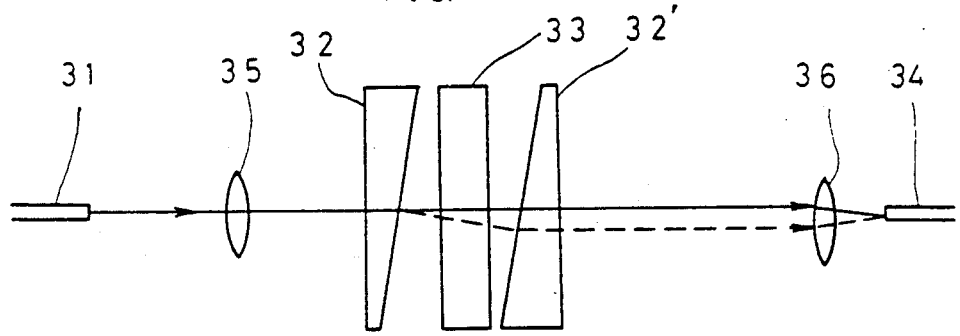
FIGS. 4A and 4B are schematic views of an optical isolator according to the invention.
Figure 4B:
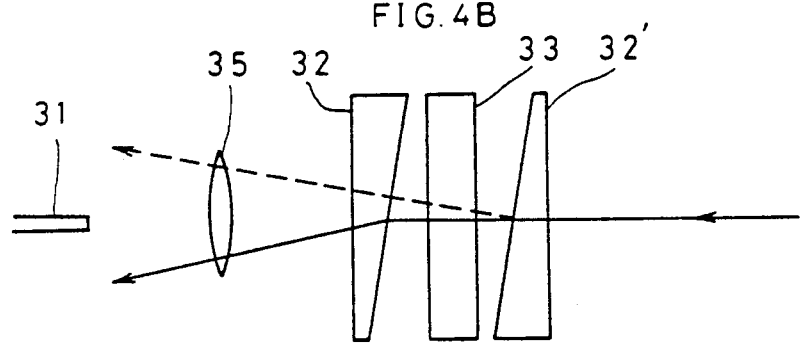

FIGS. 4A and 4B show one embodiment of an optical isolator according to the invention. As will be understood therefrom, tapered birefringent plates (tapered plates) 32 and 32′ are placed to either side of a 45° Faraday rotator 33. When light passes through the birefringent plates 32 and 32′, an angle of refraction of an ordinary ray and that of an extraordinary ray are different, so that polarization separation is realized. That is to say, when light enters in the forward direction into the first tapered plate 32, or from left to right in FIG. 4A, light is divided or separated into ordinary rays and extraordinary rays because of the difference of the index of refraction due to polarization, and these rays are refracted to different directions, and enter the 45° Faraday rotator 33. Ordinary and extraordinary rays of which planes of polarization are rotated 45° by the Faraday rotator 33 are caused to enter the second tapered plate 32′. It is so arranged that an optical axis of this second tapered plate is rotated 45° around or about the direction of light relative to an optical axis of the first tapered plate 32. Therefore, ordinary and extraordinary rays correspond to ordinary and extraordinary rays in the second tapered plate 32′ respectively. Because of this, ordinary rays and extraordinary rays that pass through the second tapered plate 32′ emanate parallel to each other. These parallel beams of ordinary and extraordinary rays are focussed onto the optical fiber 34 by the lens 36. On the other hand, light in the reverse direction (from right to left as seen in FIG. 4B) is divided into ordinary rays and extraordinary rays after entering the second tapered plate 32′, are refracted to different directions, enter the 45° Faraday rotator and are emitted therefrom with the plane of polarization rotated 45°.

An ordinary ray from the second plate 32′ with its plane of polarization rotated 45° becomes polarized light which is rotated 90° relative to an optical axis of the first tapered plate 32 which has an optical axis that is offset 31 45° relative to the optical axis of the second tapered plate 32′, so that it is refracted as an extraordinary ray relative to the first tapered plate 32. On the other hand, an extraordinary ray of the second tapered plate 32' with its plane of polarization rotated 45° is similarly refracted as an ordinary ray relative to the first tapered plate 32. That is to say, ordinary rays and extraordinary rays in the second plate 32' are converted to extraordinary rays and ordinary rays respectively in the first plate 32 by the Faraday rotator, so that the direction of each of these rays after passing through the first tapered plate 32 is different from that of incident light. Because of this, when these rays are converged by the lens 35, focal points are formed outside the face of the fiber end so that the light in the reverse direction does not enter the optical fiber 31.

As will be understood from the foregoing description, where light from the optical fiber is turned into parallel beams and caused to pass through the isolator, a tapered birefringent material is used as a polarized light separation element capable of slightly changing the direction of its travel by polarizing the light. By properly selecting the direction of the optical axis, polarized light in an arbitrary direction can be divided. And thus, a miniature polarization-independent isolator can be obtained. Further, by slightly slanting the birefringent plate and Faraday rotator, it is possible to prevent light reflected by the faces of these elements to return to where it was emitted.

As polarization-independent optical isolator which uses a half-wave plate is known. According to the invention, however an optical isolator is realized without the half-wave plate, so that the number of required components may be reduced.

Figure 5:
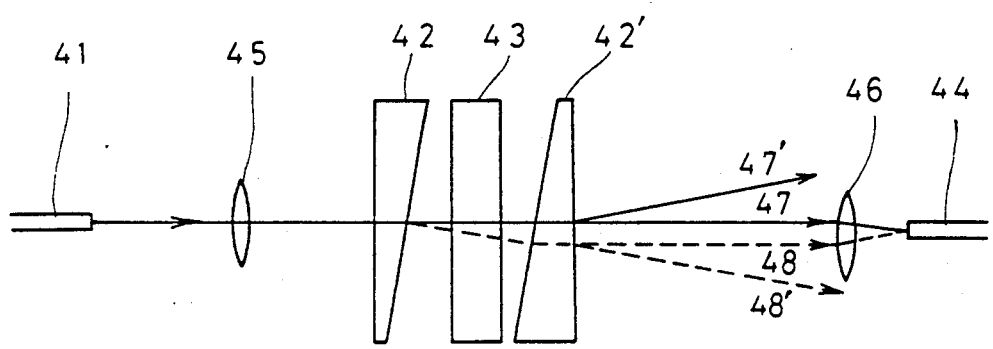
FIG. 5 is a schematic view of a phase difference-light intensity converter according to the invention.
Figure 6A:
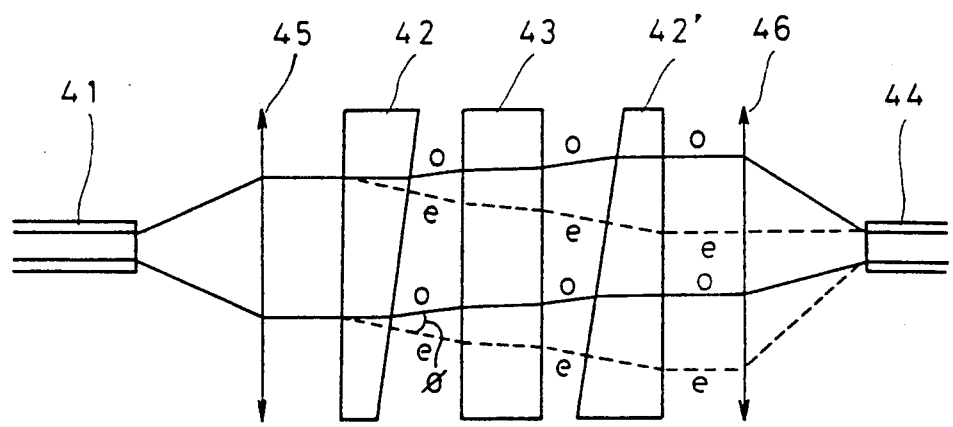
FIGS. 6A and 6B are schematic views illustrating the working of the converter of the invention.

In FIG. 5, which shows an optical modulator according to the invention, reference numeral 41 denotes an optical fiber for incident light, 45 a first lens, 42 a tapered plate of birefringent material to separate or divide polarized light, i.e., to double refract light of different polarizations, (a tapered plate), 43 an element to change the plane of polarization, 42' a tapered plate of birefringent material to combine polarized light of which the optical axis is disposed in a direction rotated around the path of light by a given angle $\theta$ (or $\theta + \pi/2$) and which, if made of the same material, has a slope parallel to that of the tapered plate 42, 46 a second lens, 44 a light receiving optical fiber, and 47, 47', 48 and 48' light.

Where an angle of rotation of the plane of polarization (polarization plane rotation angle) $\theta$ (or $\theta + \pi/2$) is given by the element 43 to ordinary ray o and extraordinary ray e which rays were angularly separated by the tapered plate 42, the angular separation is cancelled by the tapered plate 42', and these rays become parallel beams 47, 48. When condensed by the second lens 46, both ordinary ray o and extraordinary ray e given a rotation $\theta$ of the plane of polarization are condensed to the light receiving optical fiber 44 (FIG. 6A).

Figure 6B:
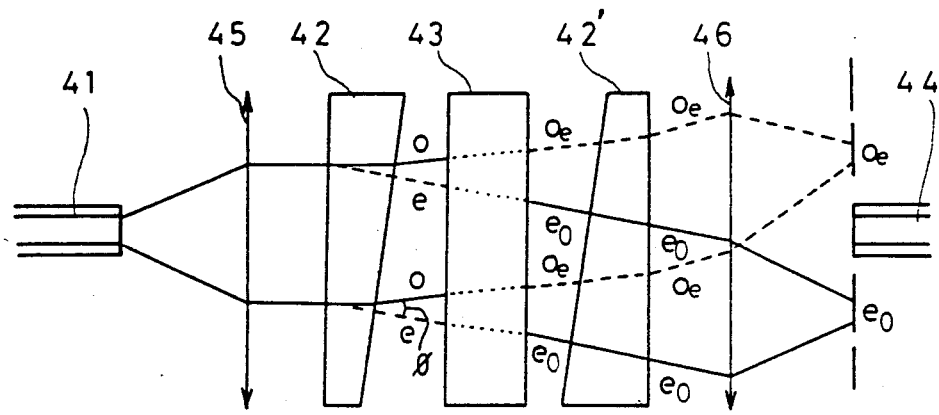
Figure 7A:
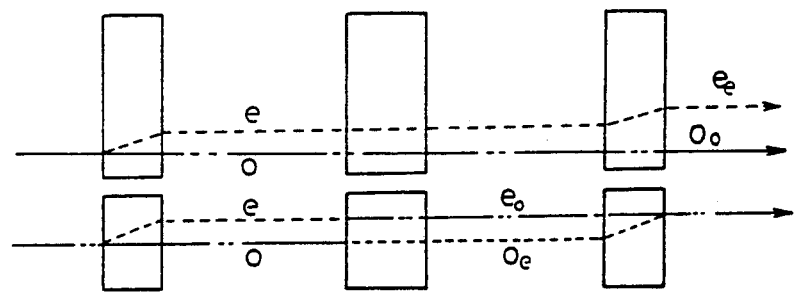
FIGS. 7A through 7D are schematic views showing modes of operation of the device of FIG. 5.
Figure 7B:
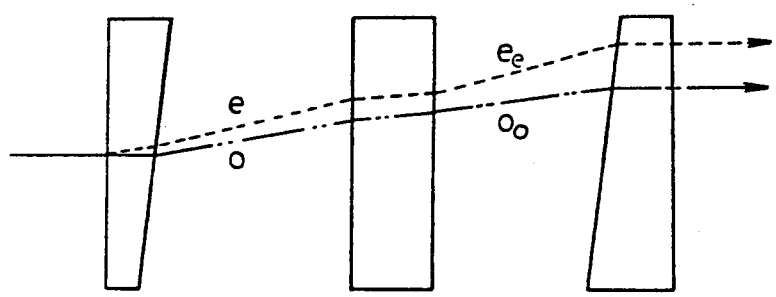
Figure 7C:
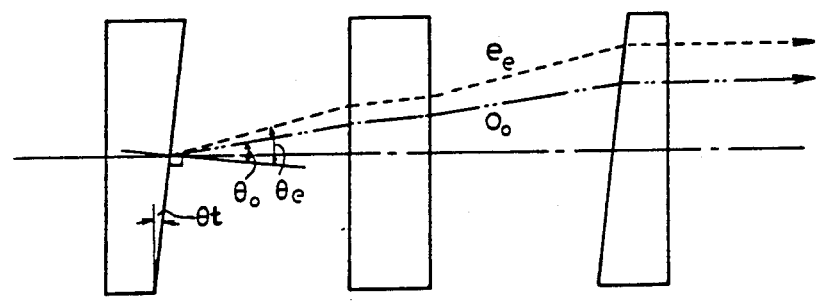
Figure 7D:
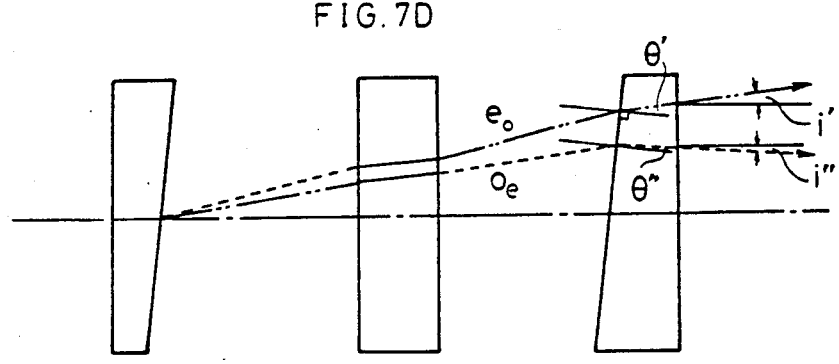

When a polarization plane rotation angle $\theta + \pi/2$ (or $\theta$) is given by the element 43 to ordinary ray o and extraordinary ray e which were angularly separated by the tapered plate 42, an ordinary ray o given a polarization plane rotation angle $\theta + \pi/2$ (or $\theta$) behaves as an extraordinary ray at the tapered plate 42', and an extraordinary ray e which was given a polarization plane rotation angle $\theta + \pi/2$ (or $\theta$) behaves as ordinary ray in the tapered plate 42'. As will be understood from 47' and 48' in FIG. 5, angular separation is increased by the tapered plate 42'. Thus, when condensed by the second lens 46, ordinary rays and extraordinary rays are given an angular separation such that ordinary rays and extraordinary rays which were given $\theta + \pi/2$ (or $\theta$) rotation of the plane of polarization are condensed at a position which is away from the axis of optical fiber at the face of the fiber end by a distance larger than the core diameter of the fiber (FIG. 6B).

In other words, where the focal length is f and the core diameter is a, an angle $\phi$ of separation by the tapered plate 42 and the tapered plate 42' is equal (for example, where both plates are made of the same material, the taper slope is equal), and its value is $$\tan \phi > a/f.$$

Specific explanation will now be made where an electrooptic crystal is used. Where light passes through the tapered plates 42 and 42', polarization separation can be effected because the refraction angle of an ordinary ray and that of an extraordinary ray are different. When light enters into the first tapered separation element made of birefringent material, light is divided into ordinary rays and extraordinary rays because the index of refraction is different depending on polarization, and refracted into different directions. Then the rays enter the electrooptic device functioning as an element to modulate the phase difference.

As an electrooptic crystal, Zinc Telluride (Zn Te), gallium-arsenide (GaAs), etc. may be used although the wavelength of light must be taken into consideration. Where its crystallographic axis is properly set relative to the direction of polarization of incident light that was linearly polarized, each of two orthogonal components of incident light are of the same phase in the plane of incidence; but in the crystal it depends on the voltage applied, and each component has a different index of refraction, depending on the direction of polarization, after passing through the crystal. A component having the plane of polarization in the direction of an axis of which the index of refraction increases by the electrooptic effect progresses slow, and a component having the plane of polarization in the direction of axis of which the index of refraction decreases progresses fast. As a result, there is a difference of phase proportionate to the applied voltage between the two components after being emitted from the crystal, and light composed of these components is generally elliptically polarized light.

Ordinary rays and extraordinary rays, each caused to have a phase difference by the electrooptic element functioning as an element to modulate the phase difference, are entered into the second tapered plate 42', having an optical axis offset by an angle $\theta$ relative to the tapered plate 42 of birefringent material. The angle $\theta$ is 0° or 90° so that the optical axes of the first and second tapered plates are parallel or perpendicular, respectively. The optical axes of the first and second tapered plates each form an angle of 45° with the principal axis of the electrooptical element, independent of $\theta$. Thus, the angle between the optical axis of each of the first and second tapered plates and the principal axis of the electrooptical element is 45° when $\theta = 0$°. Thus, the components that had no rotation of the plane of polarization by the electrooptic element relative to an ordinary ray and an extraordinary ray correspond respectively to an ordinary ray and an extraordinary ray in the second tapered plate 42', so that an ordinary ray and an extraordinary ray that pass through the tapered plate 42' become respectively light beams 47 and 48 in FIG. 5 which are parallel, and emanate.

On the other hand, the components that had 90° rotation of the plane of polarization by the electrooptic element relative to an ordinary ray and an extraordinary ray enter the second tapered plate. Since each becomes an extraordinary ray and an ordinary ray, a separation angle between refracted light beams 47' and 48' further increases, and they do not enter the light receiving optical fiber 44 even when condensed by the second lens 46. In other words, when there is no rotation of the components they emanate as parallel rays from the second tapered plate 42' and when there is a 90° rotation the ordinary becomes the extraordinary and the extraordinary becomes the ordinary so that they emanate from the second tapered plate 42' as divergent rays.

If the light receiving fiber 44 is connected to a power meter at the other end, an output signal corresponding to the applied voltage may be detected by the power meter.

Lastly, there is shown in FIG. 7 the results of experiments carried out by the inventor in this application with the device of FIG. 5. Elements to separate and combine polarized light were made of rutile ($TiO_2$) having an index of refraction as follows: Ne=2.709 and No=2.451 at $\lambda$=1.53 μm. Relevant data is set forth in the following table:

| optical fiber | switch to element to change plane of polarization | taper angle $\theta t$ of element to separate polarized light | $\theta o$ | $\theta e$ | $\theta'$ | $\theta''$ | $i' = \phi$ | $i'' = \phi$ |
|---|---|---|---|---|---|---|---|---|
| single mode | OFF | 1° | 2.45° | 2.71° | 1° | 1° | 0° | 0° |
| | ON | 1° | 2.45° | 2.71° | 1.105° | 0.905° | +0.285° | −0.235° |
| multi mode | OFF | 4° | 9.84° | 10.89° | 4° | 4° | 0° | 0° |
| | ON | 4° | 9.84° | 10.89° | 4.42° | 3.62° | +1.138° | −0.931° |

As will be understood from the foregoing description, where light from an optical fiber is divided into parallel beams by a lens to be passed through an element to change the plane of polarization, tapered birefringent material is used as an element to separate polarized light capable of slightly changing the propagation direction of beams, and by properly selecting the direction of the optic axis, polarized light in an arbitrary direction of which planes of polarization cross at right angles may be separated or divided. Thereby a miniaturized polarization independent phase difference-light intensity converting element is realized. Further, by slightly slanting the birefringent plates and an element for changing the plane of polarization, it becomes possible to prevent returning of light reflected at their faces.

If a 45° Faraday rotator is used as an element to change the plane of polarization, the device becomes an isolator.

Thus, the invention having been described in its best embodiment and mode of operation, that which is desired to be protected by Letters Patent is:

I claim:

1. An optical device for optically coupling first and second optical fibers, each optical fiber having an excitation end and a core diameter a, via an optical path between the first and second optical fibers, comprising:
    first and second lenses, located in the optical path, each lens having a focal length f and being positioned so that the focal positions of the first and second lenses are respectively located at the excitation ends of the first and second optical fibers and so that the first and second lenses collimate the light emitted from the first and second optical fibers into parallel rays;
    first and second tapered plates of birefringent material interposed between the first and second lenses to double refract light of different polarizations so that an angle of separation between ordinary and extraordinary rays is $\phi$ and the relationship tan $\phi > a/f$ is satisfied, the first and second tapered plates each having an optical axis, the optical axis of the first tapered plate being rotated by an angle of $\theta$ (or $\theta + \pi/2$) with respect to the optical axis of the second tapered plate;
    an element for changing the plane of polarization of light passing therethrough interposed between the first and second tapered plates for rotating light passing through the first tapered plate around the optical path by an angle of $\theta$ (or $\theta + \pi/2$) so that light passing through the second tapered plate emanates as separate parallel rays.

2. The optical device of claim 1, wherein the first and second tapered plates have a tapered angle $\theta t$.

3. An optical device according to claim 1, wherein said element for changing the plane of polarization is a 45° Faraday rotator, and wherein the angle $\theta$ is 45°.

4. An optical device according to claim 3, wherein said first and second tapered plates of birefringent material are composed of rutile or calcite.

5. An optical device according to claim 3, wherein said first and second optical fibers are both single mode fibers or both multi-mode fibers.

6. An optical device as claimed in claim 1, wherein said element for changing the plane of polarization comprises an electro-optic crystal of zinc telluride or gallium arsenide.

7. An optical device according to claim 1, wherein said first and second tapered plates of birefringent material are composed of rutile or calcite.

8. An optical device according to claim 1, wherein said first and second optical fibers are both single mode fibers or both multi-mode fibers.

* * * * *

UNITED STATES PATENT AND TRADEMARK OFFICE
CERTIFICATE OF CORRECTION

PATENT NO. : 4,548,478
DATED : October 22, 1985
INVENTOR(S) : Shirasaki

It is certified that error appears in the above-identified patent and that said Letters Patent is hereby corrected as shown below:

Col. 4, line 66, "31 45°" should be -- -45° --.

Signed and Sealed this

Eighteenth Day of March 1986

[SEAL]

Attest:

DONALD J. QUIGG

Attesting Officer

Commissioner of Patents and Trademarks